Figure 1:
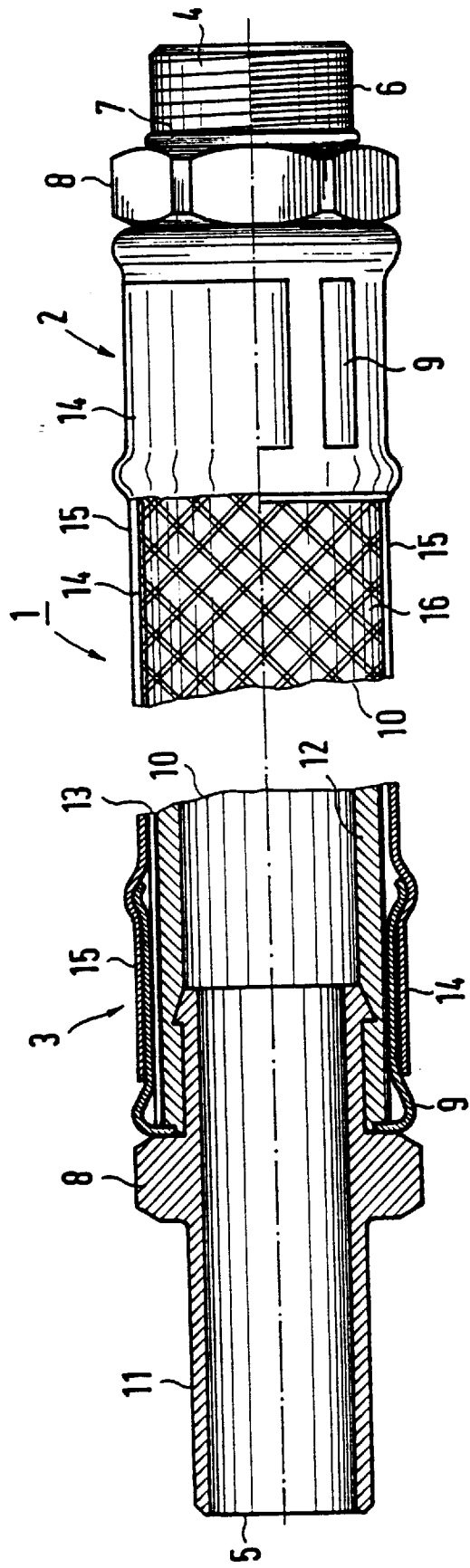

United States Patent

Bader et al.

[11] Patent Number: 5,884,945
[45] Date of Patent: Mar. 23, 1999

[54] SANITARY HOSE

[75] Inventors: Rainer Bader, Schiltach; Gerd Ostertag, Gutach, both of Germany

[73] Assignee: Hans Grohe GmbH & Co. KG, Germany

[21] Appl. No.: 656,076

[22] Filed: May 31, 1996

[30] Foreign Application Priority Data

Jun. 1, 1995 [DE] Germany .................. 195 20 195.7

[51] Int. Cl.[6] .............................. F16L 11/02; F16L 11/12
[52] U.S. Cl. ....................... 281/222.5; 285/256
[58] Field of Search .......................... 285/222.5, 222.1, 285/222.2, 222.4, 256; 138/148

[56] References Cited

U.S. PATENT DOCUMENTS

| | | | |
|---|---|---|---|
| 1,809,874 | 6/1931 | Stone | 285/222.5 |
| 2,113,211 | 4/1938 | Lake | 285/222.5 |
| 2,357,669 | 9/1944 | Lake | 285/222.5 |
| 2,363,586 | 11/1944 | Guarnaschelli | 285/222.5 |
| 2,565,184 | 8/1951 | Parlasca | 285/222.5 |
| 2,848,254 | 8/1958 | Millar | 285/222.5 |
| 2,858,147 | 10/1958 | Guarnaschelli | 285/222.5 |
| 2,987,329 | 6/1961 | Barton | 285/222.5 |
| 3,073,353 | 1/1963 | Rittenhouse | 138/148 |
| 3,623,513 | 11/1971 | Dinkelkamp | 138/148 |
| 4,669,757 | 6/1987 | Bartholomew | 138/148 |

FOREIGN PATENT DOCUMENTS

| | | |
|---|---|---|
| 2331977 | 1/1974 | Germany . |
| 8021251 | 11/1980 | Germany . |
| 4209103 | 9/1993 | Germany . |
| 4320475 | 12/1994 | Germany . |
| 1402291 | 8/1975 | United Kingdom . |

*Primary Examiner*—Eric K. Nicholson
*Attorney, Agent, or Firm*—Eckert Seamans Cherin & Mellott, LLC

[57] ABSTRACT

The invention relates to a sanitary hose, particularly a connecting hose for connecting a sanitary fitting to a water feed line. The hose has a flexible, at least single-layer hose body (10) and an encasing tube (14) surrounding it substantially over its entire length. The encasing tube (14) surrounds the hose body (10) in clearance-free manner and is displaceable relative thereto. The application of the encasing tube takes place by the reversible elastic expansion thereof in an apparatus set up for this purpose.

11 Claims, 2 Drawing Sheets

SANITARY HOSE

The invention relates to a sanitary hose, particularly a connecting hose for the connection of a sanitary fitting to a water supply pipe having a flexible, at least one-layer hose body and an encasing tube surrounding it substantially over its entire length. For the water-carrying connection of a sanitary fitting to a wall connection, e.g. an angle valve, in place of the previously used metal pipes, which had to be carefully bent in, use is made of pressure hoses. These pressure hoses essentially comprise a rubber hose, which is surrounded by a gauze wire in order to make the hose pressure-stable. The ends of the connecting hose are provided with connectors, e.g. connection nipples, which can be connected in watertight manner to the wall connection and to the water discharge fitting, e.g. a mixing battery or tap set.

In the case of coloured fittings and basins it is desirable to supply the hoses, particularly connecting hoses in a corresponding colour. It has therefore already been proposed to cover such connecting pressure hoses with coloured encasing tubes, which also protect from dirtying the gauze wire. It is thus known from German utility model 80 21 251 to coat or cover a connecting hose for a wash stand with a protective hose, which is adapted as regards colour to the sanitary means. The protective hose has an internal diameter permitting its shoving over the connecting hose. At its ends the connecting hose has larger diameter connecting beads, to which are connected the rubber hose and the braided hose with the connecting elements. By sliding over the connecting beads the position of the protective hose is fixed and rests loosely over the gauze wire hose.

From DE 42 09 103 A1, it is known in connection with shower hoses to provide an elastic hose reinforcement against buckling and tensile stressing. For this purpose a silicone hose portion is softened and expanded with a solvent, e.g. a nitro diluent and is then shoved over the hose end to be reinforced. Following the evaporation of the solvent the silicone hose contracts and engages in firmly adhering manner on the hose end below it.

DE 43 20 475 A1 describes a sanitary hose, which is also provided with a colour-adapted encasing tube. The encasing tube is loosely slid on and is supported on the terminal fitting parts between which it is displaceably placed. It is also mentioned that the encasing hose or tube can be shrunk on or applied by injecting round the inner hose. The ends of the encasing tube are covered by fitted facing caps, which engage round the connecting pieces.

The known sanitary hoses have a complicated manufacture or are not satisfactory. The problem of the invention is therefore to provide a sanitary hose, which can be easily manufactured, has satisfactory use characteristics and an optically pleasing appearance.

The invention is characterized in that the encasing tube surrounds in clearance-free manner the hose body and is displaceable relative thereto. According to the invention the encasing tube fits onto the hose body without radially constricting the latter, as is the case with a shrunk-on hose. This leads to a good seating of the encasing tube on the hose body. The hose has a compact feel unlike in the case of those hoses, in which the encasing tube is only fixed at thickened connectors to the ends of the hose and otherwise rests loose over the hose, so that on compression it is possible to detect a gap between the encasing tube and the hose body. In spite of this the encasing tube is adequately displaceable on the hose body, so that the latter can be bent on fitting, without its flexibility being impaired by a too firmly seating encasing tube, as is the case with shrunk-on hoses.

The encasing tube according to the invention preferably has a smooth inside and rests mechanically on the surface of the hose body without being connected thereto by separate connecting means such as bonding or the like. As a result of the snug engagement of the encasing tube on the hose body, it can be displaced relative thereto against a frictional resistance, which is preferably in the range 0.025 to 0.125 kp/cm$^2$ and in particular 0.05 to 0.1 kp/cm$^2$. This corresponds to a frictional force of approximately 1 to 5, particularly 2 to 4 kp in the case of a hose body with a diameter of approximately 12 mm and an encasing tube portion length of 10 cm. The length of the sanitary hose according to the invention is generally approximately between 20 and 50 cm. However, in special cases the hose can also be much longer and can have a length up to 120 cm, particularly up to 200 cm.

Particularly if it is constructed as a connecting hose, the hose body can be provided at its ends with connectors for fitting the hose and the diameter thereof is greater than that of the hose body. Generally at least one connector has a more than 10% and in particularly approximately 15% larger diameter than that of the hose body. Preferably at least one connector has a diameter which is at the most approximately 20% larger than the hose body diameter. The hose body is preferably a prefabricated pressure hose with a braided hose, which surrounds a watertight inner hose, particularly made from elastomeric material. Such pressure hoses generally have a wire gauze formed from groups of parallel, juxtaposed wires, the groups in the gauze crossing at an angle of approximately 90°. The wires are generally metal wires, but can also be plastic wires. Such braided hoses are not only very compression-resistant, but are also torsionally stable.

The encasing tube is advantageously a prefabricated tube or hose, which is elastically expandable or widenable at least in partial manner at ambient temperature and in particular by at least 15% of its diameter, but in general at least 25% thereof. In the slack state, i.e. also following a preceding expansion, the encasing tube preferably has an internal diameter, which is substantially the same as that of the hose body external diameter. Preferably the internal diameter of the encasing tube and the external diameter of the hose body are the same. If the hose body is provided on its surface with a braided hose, then the structure of the latter can preferably just be detected on the encasing tube surface, being in particular visible and/or palpable. Such a slight indentation of the braiding structure is a sign of a good snug fit of the encasing tube.

As stated hereinbefore, the encasing tube generally serves as a protective tube and a decorative tube. The encasing tube material can be completely dyed in the desired colour. In the case of a special embodiment of the invention the surface, particularly the outer surface of the encasing tube is provided with a separate colour layer, which is in particular a metallization. In a preferred embodiment the colour layer is formed by a hot embossing film, which preferably completely covers the encasing tube surface.

Hot embossing films are thin, heat-active adhesive coatings, which have on one side a metallization or some other colouring and which can be applied by the application of heat and pressure to surfaces. The hot embossing film is joined to the encasing tube surface by bonding. Generally the colouring or metallization is on the surface side of the adhesive coating, preferably on its outside. This is particularly the case with those metallizations or colourings produced by spraying or evaporation coating. The adhesive coating of the hot embossing film can also be completely dyed, so that the entire adhesive coating contains dye pigments, particularly metal pigments. The metallized or coloured adhesive coating is frequently coated with a protective varnish, which is preferably part of the hot embossing film. The protective varnish is preferably a clear varnish. The protective varnish can also be coloured in order to give the metallized or otherwise coloured adhesive coating desired colouring effects. Thus, e.g. with the same metallization, e.g. of aluminium, by colouring the clear varnish it is possible to imitate the colour of another metal, e.g. chrome, brass and copper. The sanitary hose connectors can then have the same colour. For carrying out hot embossing the hot embossing film is generally located on a carrier strip, which is removed following the embossing of the hot embossing film. Between the carrier strip and adhesive coating or protective varnish can be provided a separating coating, which facilitates the removal of the carrier strip. It has surprisingly been found that the hot embossing film embossed on the encasing tube surface with its coloured and/or metallized coatings takes part in movements of the encasing tube, particularly expansions and compressions, without having any undesired cracks or wrinkles. The hot embossing film connected to the encasing tube is consequently an integrated component of the encasing tube material. The material thickness of the hot embossing film is generally extremely small and can be in the range 2 to 20 $\mu$m, particularly 3 to 5 $\mu$m. For the metallization or other colouring a coating thickness of 0.02 to 0.03 $\mu$m is generally adequate. The adhesive coating can be in one or multiple layer form. Generally coating thicknesses of 1.5 to 3 $\mu$m are adequate. The material of the adhesive coating is generally adapted to the thermoplastic material of the encasing tube, in order to ensure a good adhesive connection. If a protective varnish is used, it can have a thickness of 1 to 1.5 $\mu$m. If higher mechanical stresses are to be expected, then the protective varnish can also be thicker.

The hot embossing film is advantageously strip-like. It can be placed in longitudinally directed manner on the hose, especially in the form of several parallel strips. However, a helically directed arrangement on the hose is also possible. The hot embossing films can also be arranged on the encasing tube with a mutual overlap of their edges. This is particularly preferred in the case of hot embossing films with a limited material thickness. The hot embossing films can also be so arranged that the edges are jointlessly abutted and at the abutment points are welded or bonded together. Hot embossing films are normally applied to firm and in particular planar surfaces. Frequently only certain surface zones are embossed on the substrate. Plastic hoses, particularly flexible plastic hoses, are unstable substrates having a curved surface. It is also possible to metallize or colour by hot embossing flexible plastic hoses, if at least during the application and embossing of the hot embossing film they are present in a substantially pressure-stable form. Such a pressure-stable form can be obtained by using a plastic hose which can be collapse in flat manner. It is also possible and preferred to apply an internal pressure, particularly of gas to the plastic hose for producing an adequate pressure stability. Such an internal pressure can be in the range approximately 1 to 5 bar. The hot embossing of the encasing tube is preferably formed continuously and in particular in full-surface manner, in that it is moved relative to a hot embossing tool, which can in particular be in hot embossing roller form.

The invention also relates to a method for the production of the hose and in particular for coating the previously formed hose bodies of predetermined length with an encasing tube. The method is characterized in that a flexible encasing tube with an internal diameter substantially corresponding to the external diameter of the hose body is expanded or widened by the action of mechanical, particularly pneumatic means and the hose in the expanded state, during the time when the means are acting on the encasing tube, is guided by a relative movement over the hose body to be coated and the expanding means are then removed, so that the encasing tube decreases in diameter again as a result of its inherent elasticity and is applied in full surface manner to the hose body. Thus, the encasing tube is placed by mechanical expansion and elastic tapering round the hose body.

This method can be very rapidly and economically performed. The hose body can be covered with the encasing tube over its entire length. If the hose body is already provided with connecting nipples, they can also be coated to the desired extent and appropriately attachment surfaces are recessed for fitting tools, such as key faces. The elastic expansion and tapering is advantageously performed substantially at ambient temperature. Thus, there is no need for temperature changes or other aids, such as solvents or the like to act on the encasing tube. The expansion of the encasing tube advantageously takes place in sections, preferably longitudinal sections of the encasing tube being expanded which are somewhat longer than the length of the hose body to be coated. The hose section to be expanded can preferably be an end piece of a long hose supply. It is consequently possible to cut to length the hose portion from the hose supply after the coating or covering of the hose body, so that the encasing tube portion length can be automatically adapted to the hose body length.

The interior of the encasing tube is preferably subject to a higher pressure than is required for expanding the encasing tube to the widened diameter necessary for inserting the hose body. This measure permits a rapid and reliable working. Particularly for avoiding an overexpansion of the encasing tube and for mechanically stabilizing the latter during the covering of the hose body or the insertion of the hose body into the expanded encasing tube, the expansion of the encasing tube during pressure action and in particular the action of compressed air is advantageously mechanically limited. For this purpose the expansion of the encasing tube can take place against the inner wall of a tubular sleeve against which the encasing tube rests. This sleeve can be porous or perforated, so as to avoid any air cushions between the encasing tube and sleeve during expansion. During expansion and the relative movement between the encasing tube and the hose body, there is preferably at least a partial flow through the tube. For this purpose the encasing tube can be partly open at at least one end, so that the compressed air can escape. As a result of such a dynamic expansion no sealing problems occur.

In a particularly preferred embodiment of the invention the compressed air required for the expansion of the encasing tube is introduced into the latter through the hose body to be covered. For this purpose a hose body end directed in the relative feed direction can be moved up to a free end of the encasing tube. Compressed air flowing out of the hose body passes into the encasing tube and expands the latter, so that the hose body can be inserted into the expanded encasing tube relative thereto. The narrow gap between the hose body and the encasing tube, which is defined by the expansion limiter, ensures an adequate counterpressure in the encasing tube, so that it remains in the expanded state during pressurization. The hose body to be covered can be kept on a mandrel during the covering process and said mandrel stabilizes the flexible hose body in the stretched state. Advantageously the mandrel is constructed as a compressed air-carrying hollow mandrel. It is consequently sufficient to merely engage the hose body to be covered on the hollow mandrel, without any need for a connection thereof to the compressed air line. Simultaneously the interior of the hose body is substantially unstressed by the compressed air, so that it is possible to avoid any undesired, small diameter expansion of the hose body during the covering process.

During expansion one end of the encasing tube portion, which is preferably still connected to the hose or tube supply, is closed and in particular reversibly squeezed closed. When the hose body has been completely introduced into the expanded encasing tube portion, the compressed air supply can be disconnected, so that as a result of the pressure drop the expansion is automatically cancelled out and the encasing tube engages over the inserted hose body. After opening the closure the covered hose body with the encasing tube over it can be drawn off, particularly drawn out of the expansion limiter. As the closed end of the encasing tube portion is preferably still connected to the hose supply, automatically a new encasing tube portion is drawn off. By correspondingly cutting to length the encasing tube at the covered hose body, particularly in the vicinity of an at least partly jointly covered connector, the covering process is complete and a new hose body can be introduced accompanied by the simultaneous expansion of the new encasing tube portion.

The invention also relates to an apparatus for performing the method and for the production of the sanitary hose according to the invention. This apparatus is characterized by a reversible expanding device for the encasing tube, a holding device for the flexible hose body and a feed device for the relative sliding into one another of the hose body and encasing tube. As the hose body is prefabricated and has a predetermined length, which can differ, the apparatus according to the invention preferably operates in a timed or sectionwise manner by moving backwards and forwards.

The expanding device is advantageously a pneumatic expanding device, which in particular operates with compressed air. It has surprisingly been found that, despite the dynamic operation, the compressed air consumption is low, which can be attributed to the narrow air gaps between the expanded encasing tube and the hose body.

This air gap can be defined by a preferably provided expansion limiter for the encasing tube, which is preferably tubular and surrounds said tube during expansion. The holding device for the hose body is advantageously simultaneously part of the expanding device and has in particular a hollow mandrel connectable to a compressed air source, on which is located during the expansion process the hose body to be covered. Simultaneously the holding device centres the hose body during introduction into the expanded encasing tube. The holding device is advantageously connected to a feed device, which introduces the hose body located on the holding device into the expanded encasing tube. However, it is also possible to provide a feed device on the expanded encasing tube portion, which shoves the expanded encasing tube over the centred hose body. As mentioned above, the feed device can preferably be moved backwards and forwards and during the backward movement preferably also serves as a device for removing the encasing tube from a supply means and in particular serves as a device for drawing a new encasing tube portion into the expanding device.

With the apparatus according to the invention is advantageously associated a cutting device, which cuts the encasing tube portions to an appropriate length, particularly when already on the hose body from an encasing tube supply. The expanding device advantageously has a sealing device, particularly a clamping device, which seals prior to the start of the expansion the encasing tube portion to be expanded at a point which in particular still belongs to a tube supply.

The expansion limiter advantageously has an internal, particularly circular cross-section, whose internal diameter is approximately 10 to 30%, particularly approximately 20% larger than the diameter of the thickest part of the hose body to be introduced into the expanded hose and which can also be a part to be covered. The absolute dimensional difference between the hose body diameter and the expansion limiter internal diameter also depends on the wall thickness of the encasing tube. This is generally between 4 and 8% of the diameter of the hose portion of the hose body. With a hose body with a diameter of e.g. 10 to 15 mm, particularly approximately 12 mm, the encasing tube wall thickness can be between 0.2 and 1.0 mm, particularly between 0.3 and 0.8 mm. By corresponding, appropriate matching between the maximum hose body diameter, encasing tube wall thickness and expansion limiter internal diameter, the annular clearance for the outflow of compressed air during the covering process can be set to the desired level permitting a rapid, troublefree operation.

Further features of the invention can be gathered from the following description of preferred embodiments in conjunction with the drawings and subclaims. The individual features can be implemented individually or in combination. In the drawings show:

FIG. 1 A part sectional sanitary hose according to an embodiment of the invention.

Figure 2:
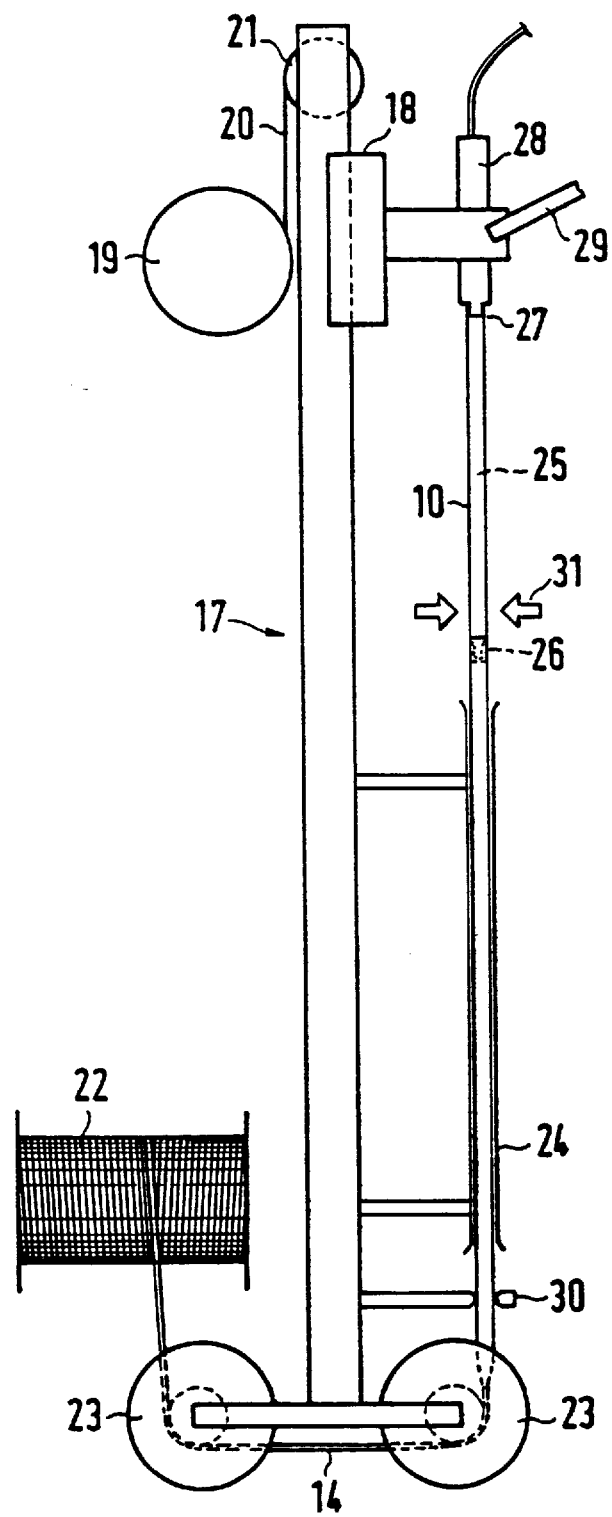

FIG. 2 A diagrammatic side view of an embodiment of the apparatus for producing the sanitary hose.

The sanitary hose 1 shown in FIG. 1 is a pressure hose for connecting a sanitary fitting to a water line. The pressure hose length is 30 cm and its ends 2, 3 are provided with connecting nipples 4, 5, the connecting nipple 4 having a connecting thread 6, a sealing ring 7 and a hexagon head 8 for the attachment of a wrench, as well as a clamping collar 9 in the form of a metal sleeve, which sealingly connects the hose body 10 to the nipple 4. The connecting nipple 4 is used for screwing to a sanitary fitting. The connecting nipple 5 has a substantially cylindrical plug-in insert 11 for insertion in an angle valve of a wall connection, together with a hexagon head 8 and a clamping collar 9, which sealingly connects the other end of the hose body 10 to the nipple 5. The hose body comprises a rubber hose 12, which is surrounded by a wire gauze 13. The hose body 10 and part of the connecting nipples 4, 5, namely most of the clamping collars 9, are surrounded by an encasing tube 14, which engages tightly on the wire gauze 13 of the hose body 10. The hose body 10 has an external diameter of 12 mm. The encasing tube 14 has a wall thickness of 0.6 mm. Its internal diameter is also 12 mm, apart from the locations of the connecting nipples, which have a larger diameter and are surrounded by the encasing tube. The bead-like ends of the clamping collars 9 and the hexagon heads 8 of the connecting nipples are the parts of the connecting nipple-equipped hose body having the largest diameter. The diameter is approximately 14 mm and therefore approximately 17% larger than the diameter of the hose body 10 in the vicinity of the wire gauze 13.

The encasing tube 14 is made from flexible polyvinyl chloride and is expandable by at least 25% of its diameter or circumference. Its surface has a silvery metallization. The metallization consists of overlapping strips of hot embossing films 15, which have an aluminium vapour deposition and cover the surface of the encasing tube 14. Over the metallization is located a protective varnish, which can be part of the hot embossing film, or a transparent plastic coating.

The encasing tube 14 is mechanically connected to the hose body 10 by snug fitting on said hose body 10 or the wire gauze 13. As a result of the diameter-accurate-fit seating on the wire gauze, its structure can just be detected through the encasing tube surface, as is diagrammatically indicated at 16. Thus, on grasping the sanitary hose, it is considered that the encasing tube is an integrated part of said hose. Due to the fact that it rests on the hose body essentially without tension due to the identical diameters, it is displaceable relative thereto against a frictional resistance, particularly if the sanitary hose is bent, or, as is possible to a limited extent with a braided hose, stretched. Thus, the sanitary hose movement is not impeded by the encasing tube. Admittedly in the represented embodiment the encasing tube is additionally fixed on the clamping collar 9 of the connecting nipple, particularly at the larger diameter points thereof. However, it is also possible for the encasing tube at the transitions of the wire gauze 13 into the connecting nipples 4 or 5 to terminate upstream thereof, so that there is no engaging over the clamping collars 9. This is intimated in the vicinity of the connecting nipple 4. As a result of the snug fitting and frictional resistance the encasing tube is adequately fixed on the hose body 10, so that in particular there is no need for fixing means, such as end caps or the like.

The apparatus for producing the sanitary hose according to the invention shown in FIG. 2 has a vertically positioned frame 17, on which is vertically movable a slide 18, which serves as the feed device. With the slide 18 is associated a spring mechanism 19, which is connected by means of a wire rope 20 and a guide pulley 21 located at the upper end of the frame to the slide 18 and essentially cancels out its weight.

At the lower end of the frame is located a supply reel 22 onto which is wound a supply of encasing tube 14. The encasing tube can be drawn from the reel 22 by means of two guide pulleys 23 located at the lower end of the frame and introduced into a guide tube 24, which is positioned parallel to the slide guide or the frame 17 and which serves for orienting the encasing tube 14 and as its expansion limiter. On the slide 18 is located a hollow mandrel 25, which is coaxial to the guide tube 24 and which, starting with its free end 26, can be completely inserted in the guide tube 24. The opposite end 27 with which the hollow mandrel 25 is fixed to the slide 18 is equipped with a compressed gas valve 28, which is connectable to a compressed gas line and is operable by pressing down an operating handle 29. With the aid of the said handle the slide together with the hollow mandrel can be moved downwards.

Onto the hollow mandrel 25 can be slid a hose body 10, whose ends can be provided with connecting nipples 4, 5. The hose body can be held on the hollow mandrel with the aid of a not shown locking member or latch.

The apparatus according to the invention also has a clamping device 30 in the lower region of the frame, which is positioned between the guide tube 24 and the adjacent guide pulley 23 and engages on a portion of the encasing tube 14 located between the guide pulley and the guide tube. The clamping device 30 is controlled by means of the compressed air valve and closes if the operating handle 29 is forced downwards and compressed gas flows through the hollow mandrel 25. On introducing the hollow mandrel 25 with the hose body 10 into the guide tube 24, in which is located a portion of the encasing tube 14, the latter is expanded with the aid of the compressed gas and as a result of the pressure cushion which has built up in the encasing tube and the closed clamping device 30, it is applied to the inner wall of the guide tube 24, whose wall has fine openings through which the air located between the tube 14 and the guide tube 24 can escape. Due to the diameter increase of the encasing tube its opening is so large that the hose body together with any connecting nipple 5 located at the free end 26 of the hollow mandrel 25 can be introduced through the encasing tube into the guide tube 24. By raising the operating lever 29 the compressed air valve 28 is closed and the pressure in the system drops, so that the diameter of the encasing tube decreases and the tube engages over the hose body 10. Simultaneously the clamping device 30 opens. The hollow mandrel 25 together with the engaged hose body 10 and the drawn over encasing tube portion can be drawn out of the guide tube 24 and a new encasing tube portion can be removed from the reel 22 and introduced into the guide tube 24. By means of a cutting device 31 located in the vicinity of the opening of the guide tube 24, the new encasing tube portion can be cut at an appropriate point from the covered hose body 10, so that the process can recommence. For this purpose, onto the hollow mandrel 25 is engaged a new hose body 10. It is also possible to pivotably arrange on the frame 17 several hollow mandrels, which can be equipped in turn with hose bodies 10 and can be successively introduced into the guide tube 24 for the covering of the hose body. The apparatus can also be operated fully automatically without any significant modifications.

We claim:

1. Sanitary connecting hose for the connection of a sanitary fitting to a water feed line comprising:

at least a single-layer, flexible hose body; and
   a prefabricated encasing tube having (i) an internal diameter that is substantially the same as the external diameter of said hose body, and (ii) a smooth inside surface, said encasing tube substantially surrounding and snugly engaging the outer surface of said hose body over said hose body's entire length in a clearance-free manner and being displaceable relative to said hose body and against a frictional resistance therefrom, wherein said encasing tube is elastically expandable, at ambient temperature, by more than 15% of said diameter.

2. The sanitary hose of claim 1 wherein the encasing tube is reversibly expandable in diameter through application of compressed air at a predetermined pressure to an interior of the encasing tube to permit insertion of the hose body.

3. The sanitary hose of claim 2, wherein the encasing tube is reversibly expandable at ambient temperature.

4. Sanitary hose according to claim 1 wherein said frictional resistance is in a range of 0.025 to 0.125 mp/cm$^2$.

5. Sanitary hose according to claim 1 wherein said hose body has a connector disposed at each end thereof for fitting said sanitary hose to said sanitary fitting and said water feed line and wherein the diameter of said sanitary hose is larger than said external of said hose body.

6. Sanitary hose according to claim 1 wherein said flexible hose body comprises a prefabricated pressure hose including a braided gauze hose which surrounds an elastomeric inner hose.

7. Sanitary hose according to claim 6 wherein a structure of said braided gauze hose is visibly detectable on the surface of said encasing tube.

8. Sanitary hose according to claim 1 wherein a surface of said encasing tube has a separate color coating.

9. Sanitary hose according to claim 8 wherein the color coating is part of at least one hot embossing film surrounding said encasing tube.

10. Sanitary hose according to claim 8 wherein the color coating of said encasing tube is covered with a transparent protective coating.

11. Sanitary hose according to claim 6, wherein a structure of said braided gauze hose is palpably detectable on the surface of said encasing tube.

* * * * *